(12) United States Patent
Lebeaupin et al.

(10) Patent No.: US 11,847,749 B2
(45) Date of Patent: Dec. 19, 2023

(54) DIGITAL MISSION PREPARATION SYSTEM

(71) Applicant: AIRBUS DEFENCE AND SPACE SAS, Toulouse (FR)

(72) Inventors: François Lebeaupin, Elancourt (FR); Fabien Dumon, Elancourt (FR); Nicolas Raggueneau, Elancourt (FR); Olivier Frouin, Elancourt (FR); Bertrand Oustriere, Elancourt (FR); Guillaume Vauclin, Elancourt (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 3 days.

(21) Appl. No.: 17/618,651

(22) PCT Filed: Jun. 10, 2020

(86) PCT No.: PCT/EP2020/066136
§ 371 (c)(1),
(2) Date: Dec. 13, 2021

(87) PCT Pub. No.: WO2020/249639
PCT Pub. Date: Dec. 17, 2020

(65) Prior Publication Data
US 2022/0358725 A1    Nov. 10, 2022

(30) Foreign Application Priority Data
Jun. 13, 2019 (FR) ...................................... 1906301

(51) Int. Cl.
*G06T 19/00* (2011.01)
(52) U.S. Cl.
CPC .................. *G06T 19/006* (2013.01)

(58) Field of Classification Search
CPC .............................. G06T 19/006; G09B 3/02
See application file for complete search history.

(56) References Cited

U.S. PATENT DOCUMENTS

| 4,807,158 | A | * | 2/1989 | Blanton | G09B 9/301 |
| | | | | | 345/581 |
| 7,190,496 | B2 | * | 3/2007 | Klug | G03H 1/268 |
| | | | | | 359/9 |

(Continued)

FOREIGN PATENT DOCUMENTS

| AU | 2013271981 B2 * | 4/2016 | ......... G01C 21/3608 |
| WO | WO 2018/136517 A1 | 7/2018 | |

OTHER PUBLICATIONS

International Search Report as issued in International Patent Application No. PCT/EP2020/066136, dated Sep. 25, 2020.

(Continued)

*Primary Examiner* — Chante E Harrison
(74) *Attorney, Agent, or Firm* — Pillsbury Winthrop Shaw Pittman LLP (57) ABSTRACT

A system for preparing a mission from a digital mapping, includes a mission editor generating mission elements that can change over the course of several determined temporal phases, including on a network a mission server, a mapping server, a server for sharing at least one centre of the map and a plurality of augmented reality headsets, at least one of the augmented reality headsets, called master headset, being able to generate at least one command for modifying the centre, each headset being able to receive at least two sets of elevation and terrain tiles from the mapping server, the mission server interfacing with the headsets to share and update the mission elements and to change them over time.

10 Claims, 7 Drawing Sheets

(56) References Cited

U.S. PATENT DOCUMENTS

| | | | |
|---|---|---|---|
| 2008/0158256 A1* | 7/2008 | Russell | G06T 7/32 345/629 |
| 2008/0186255 A1* | 8/2008 | Cohen | G06F 3/0321 345/179 |
| 2010/0185984 A1* | 7/2010 | Wright | G06F 16/29 715/833 |
| 2010/0313146 A1* | 12/2010 | Nielsen | G06T 19/006 715/757 |
| 2011/0055746 A1* | 3/2011 | Mantovani | B63C 11/26 715/848 |
| 2011/0199376 A1* | 8/2011 | Salemann | G06T 17/05 345/424 |
| 2012/0158762 A1* | 6/2012 | Iwuchukwu | G06F 16/29 707/E17.014 |
| 2013/0162632 A1* | 6/2013 | Varga | H04N 13/383 345/419 |
| 2013/0249948 A1* | 9/2013 | Reitan | G06T 19/00 345/633 |
| 2015/0260474 A1 | 9/2015 | Rublowsky et al. | |
| 2015/0262429 A1* | 9/2015 | Shuster | A61B 5/082 345/633 |
| 2017/0309198 A1* | 10/2017 | Johnson | G06Q 50/01 |
| 2018/0218214 A1* | 8/2018 | Pestun | G06V 20/188 |
| 2019/0325654 A1* | 10/2019 | Stisser | A63F 13/26 |
| 2020/0082630 A1* | 3/2020 | Sharma | G06F 3/0482 |
| 2020/0082734 A1* | 3/2020 | Sharma | G06T 19/003 |
| 2021/0272367 A1* | 9/2021 | Richter | G06T 19/006 |

OTHER PUBLICATIONS

Weissker, T., et al., "Multi-Ray Jumping: Comprehensible Group Navigation for Collocated User in Immersive Virtual Reality," 2019 IEEE Conference on Virtual Reality and 3D User Interfaces, Mar. 2019, pp. 136-144.

* cited by examiner

DIGITAL MISSION PREPARATION SYSTEM

CROSS-REFERENCE TO RELATED APPLICATIONS

This application is the U.S. National Stage of PCT/EP2020/066136, filed Jun. 10, 2020, which in turn claims priority to French patent application number 1906301 filed Jun. 13, 2019. The content of these applications are incorporated herein by reference in their entirety.

TECHNICAL FIELD OF THE INVENTION

The technical field of the invention is that of environment simulation systems and in particular digital mission simulators.

TECHNOLOGICAL BACKGROUND OF THE INVENTION

Known virtual reality or augmented reality systems are generally based on apparatuses of virtual reality (VR) headset or augmented reality (AR) headset type making it possible to display virtual objects in three dimensions, either in a virtual environment in the case of virtual reality, or by superimposing them on the real environment in the case of augmented reality.

The document WO2018136517 entitled "AUGMENTED/VIRTUAL MAPPING SYSTEM" is known from the prior art. This document describes virtual reality and augmented reality systems aiming to create a virtual reality space that can be used by several users, notably for the training of soldiers. The system comprises a graphic processing unit, for each user of a virtual reality headset, the processing unit calculating the transformations of images coming from drones, the synchronisation of these images and the application of a physical engine for the supply, by a resulting video stream, of the headset with which it is associated. Such a system requires however considerable processing power, each headset being associated with its own unit for processing information and for generating a video stream.

In the case of the use of virtual reality or augmented reality for mission simulations, notably the simulation of military, rescue or crisis management missions, the multiplication of the players involved in the mission leads to the multiplication of the units for processing information to make it possible to supply, to each headset, its own video stream. Such an equipment is thus not suited to an emergency deployment or in the field. A need thus appears to supply a system that is easily transportable and of limited bulk in particular for deployments in the field.

SUMMARY OF THE INVENTION

The invention offers a solution to the aforementioned problems, while enabling a system that is easily transportable, of limited bulk thanks to a centralisation of calculations by servers within a network realising functionalities for each of the headsets linked to a mission.

One aspect of the invention thus relates to a system for preparing a mission in a determined georeferenced zone from a digital mapping stored in a memory, comprising a digital mission editor in the georeferenced zone generating a set of georeferenced mission elements which can change over the course of several determined temporal phases, characterised in that it comprises in a communication network at least:

a mission server in communication link with the mission editor,
a mapping server generating a map from the stored mapping,
a server for sharing at least one centre of the map and
a plurality of augmented reality headsets, at least one of the augmented reality headsets, called master headset, being capable of generating at least one command for at least one modification of the centre of the map, each augmented reality headset being capable of receiving at least two sets of elevation and terrain tiles coming from the mapping servers on request of each headset, the mission server being capable of interfacing with the mission editor and with the augmented reality headsets to share and update the set of georeferenced mission elements on request of each headset and to make them evolve temporally on request of at least the master headset.

Thanks to the invention, the means linked to the mapping and to the mission are mutualised for the headsets. The reduced bulk of the system thus enables deployment in the field thanks to limited computing power, a part of the functionalities of the system being carried out by the mission server, the mapping server and the sharing server for each headset involved in the mission.

The mission preparation system according to the invention is fully interactive, a user being able to carry out commands using his fingers or his hands or simply by positioning himself physically with respect to the map while pointing with his finger to an element of interest.

Apart from the characteristics that have just been mentioned, the mission preparation system according to one aspect of the invention may have one or more complementary characteristics among the following, considered individually or according to all technically possible combinations thereof:

each headset comprises a holograph simulation function, by stereoscopic display, the hologram comprising a three-dimensional mapping in which the terrain tiles are placed over a relief constituted by the elevation tiles and superimposing the mission elements at the level of the relief.

the holograph simulation function of each headset carries out a hologram calculation in three dimensions in an area at the edge of the displayed hologram, ready to be projected in a fluid manner in the event of modification of the centre of the map.

said master headset activates at least one camera for at least partial recognition of a hand of a user of the master headset for actuating functions, proposed in a displayed menu, for at least one translation of the centre of the map.

the last centre of the map adjusted by the master headset is taken into account for the tile requests of each headset, transmissions of previous tiles on intermediate modified centres being abandoned.

the preparation system comprises at least one marker arranged on at least one hardware object around which gather the users of the headsets, an image of said marker being captured by a camera of each headset and processed to carry out an adjustment of the positioning of the centre of the map and an adjustment of the orientation of the map.

said hardware object around which gather the users of the headsets is in the form of a surface table corresponding substantially to the surface on the ground of the displayed hologram.

the sharing server also carries out a sharing of at least the position of each headset with respect to the map, as well as a sharing of the zoom level.

the mapping server calculates and stores in a memory, from the high definition digital mapping, a first series of tiles of a first high definition level and at least one second series of tiles of a second lower definition level.

each headset comprises a function for detecting its hardware environment.

The invention and the different applications thereof will be better understood on reading the description that follows and by examining the figures that accompany it.

BRIEF DESCRIPTION OF THE FIGURES

The detailed description will be made with reference to the following figures, given as non-limiting examples, in which.

DETAILED DESCRIPTION

The figures are presented for indicative purposes and in no way limit the invention.

Figure 1:
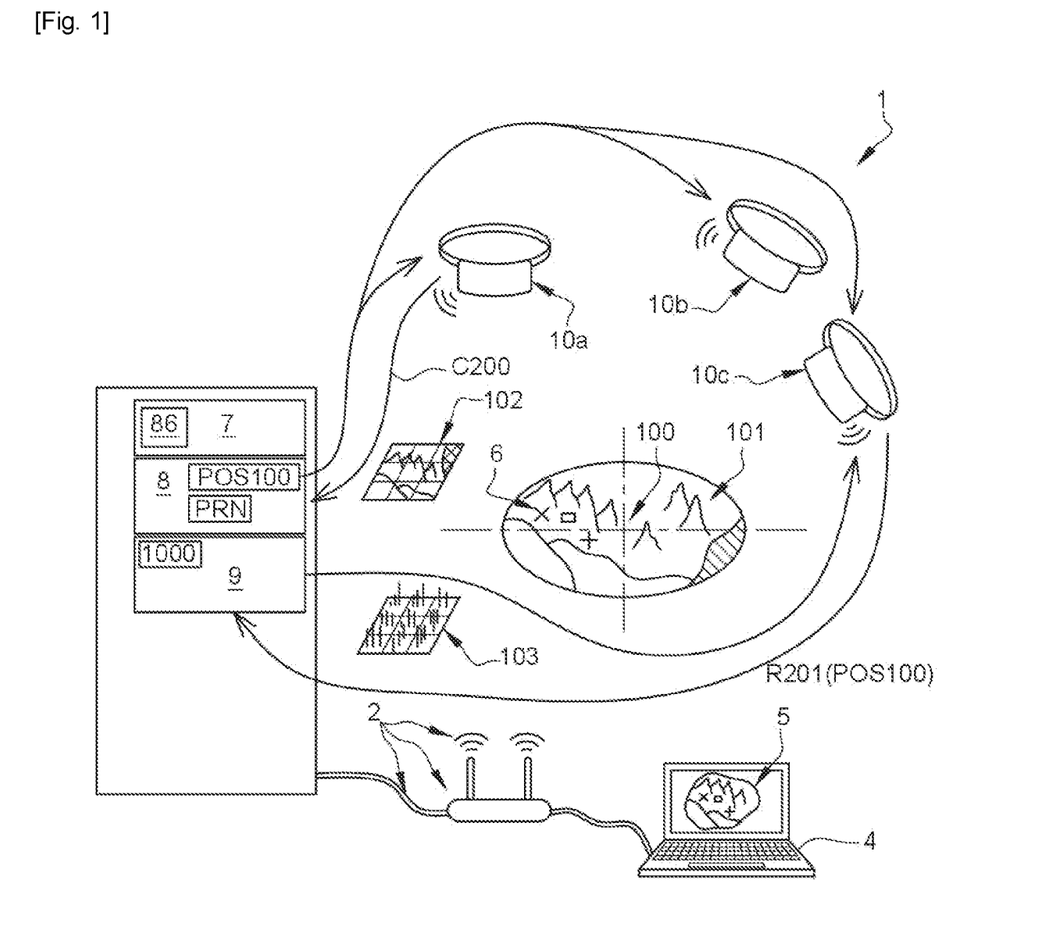
FIG. 1 shows a schematic representation of an exemplary exchange of data in a mission preparation system according to the invention.

FIG. 1 shows an exemplary exchange of data in a mission preparation system according to the invention.

The mission preparation system 1 represented in FIG. 1 comprises hardware and software elements, enabling collaborative work around a virtual map 101 presented in the form of a three dimensional hologram. Such a hologram is for example simulated by display of two stereoscopic images in the augmented reality headset. This virtual map 101 appears for each user thanks to the projection of the mapping hologram in each headset. The mission preparation system 1 in fact comprises a plurality of augmented reality headsets 10a, 10b and 10c.

Each headset 10a, 10b and 10c is a standalone peripheral, provided with an environment system, a processor and a memory in which are installed applications. Each headset notably comprises an application for managing sensors integrated in the headset. Each headset also comprises an application for managing communication links with different servers. Each headset can thus regularly request the data necessary to display a pair of stereoscopic images forming its mapping hologram. Each headset 10a, 10b and 10c is provided with a display system which projects a stereoscopic content making it possible to visualise virtual objects in three dimensions. The updating of the pair of stereoscopic images may for example follow a modification of the shared content or a displacement of the headset, which makes it possible to move around virtual objects in three dimensions. The headset is for example of the HOLOLENS-2 ® type supplied by the Microsoft® Company.

Each headset 10a, 10b and 10c is connected, via a communication network 2, to a mission server 7, to a sharing server 8 and to a mapping server 9, each server being comprised in the mission preparation system 1. The communication network may for example be in the form of a network including one or more wired networks of Ethernet or Internet type and one or more wireless networks of Wi-Fi type managed by one or more routers.

The mission preparation system 1 further comprises a mission editor 4 connected to the communication network. The mission editor 4 has the capacity of connecting to the mapping server 9 and to the mission server 7 to contribute to the elaboration of a mission. The mission editor 4 enables the execution of a mission creation function F80, a mission modification function F81 or a mission deletion function F82. Different phases and different mission elements 6 in correspondence with one or more phases are thus created, modified or deleted. The mission editor 4 further executes a mission edition function which is then transferred to the mission server.

"Mission" is taken to mean an operation comprising an objective, for example a rescue operation or a military operation, in a georeferenced zone. A georeferenced zone is a geographic zone to which are attributed coordinates in a geographic reference system. A mission comprises phases Ph1, Ph2, Ph3. "Phase" Ph1, Ph2 and Ph3 is taken to mean a step of this mission. For example, in the case of a rescue mission for a buried person, the mission may comprise climbing phases Ph1, clearing phases Ph2 and rescue phases Ph3. A phase comprises mission elements 6 arranged at georeferenced emplacements. "Element" is taken to mean an individual, a group of individuals, a unit on the ground, on water or in the air, a point of interest or another virtual object.

The mission editor 4 may also be used to visualise a mission underway, in a dedicated mode. To this end, the editor comprises a sandbox function F84. It then enables a display of the cartographic background represented in 3 dimensions, on which are arranged the mission elements 6, the visualisation being done on a conventional two-dimensional screen. The hybrid collaboration function F84, also called "sandbox" mode, enables the digital editor 4 to synchronise itself with the headsets 10a, 10b and 10c thanks to a periodic loading of the mission and the virtual map 101, from the mapping server 9, as a function of the centre 104 of the map 101 and the zoom level shared by the sharing server 8 via its sharing function FP62, whereas the mission and the phase underway are recovered from the mission server 7.

The sharing server 8 comprises for example, in a shared memory space, the relative spatial positions of the headsets 10*a*, 10*b* and 10*c* and the centre 104 of the virtual map 101. The sharing server notably comprises a function FP60 for sharing the positions and the orientations of each headset in a virtual space. The sharing server also comprises a function FP62 for sharing the centre of the map and the zoom level. The sharing server also comprises for example a function FP61 for sharing elements in the course of modification.

The mapping server 9 is configured to provide two sets of tiles to each headset: a set of elevation tiles 102 and a set of terrain tiles 103. The mapping server comprises for example a function F150 for importing georeferenced images stored in a memory space in the form of a digital mapping 1000. The images are for example satellite images making it possible to cover a geographic zone of interest. The mapping server also comprises for example a function F151 for importing elevation models. These elevation models may be derived from databases or calculated from stereoscopic images.

The mapping server also comprises a function F153 for calculating and sending the two sets of elevation and terrain tiles as a function of the zoom level. The terrain tiles are also designated image tiles. The satellite images will thus be placed over the elevation models for the visualisation, in each headset, of a three dimensional hologram showing notably a realistic map in relief.

The mapping server 9 has, for example, the capacity to calculate in advance, for a same determined zone, the tiles being able to compose this zone, at different zoom levels. This makes it possible to optimise the speed of display of tiles on a zone during change of zoom or during a displacement of the centre of the map. To this end, the mapping server comprises a function F152 for pre-calculating terrain tiles at the different zoom levels.

The mission server 7 is configured to provide the data necessary for the display, in the mapping hologram, of the mission underway, namely the updated positions of the mission elements, as a function of the zoom level and the map centre. During the passage from one phase to another, the mission server may also generate transition elements, such as for example an arrow representing the displacement of an element during the passage from one phase to the other. Each headset is able to make regularly a request for the acquisition, from the mission server 7, of data representative of the mission underway.

The mission server 7 comprises for example a function FM30 for creating a new mission. The mission server may also comprise a function FM40 for loading this mission in each headset and a function FM41 for loading, in each headset, a phase underway.

The master headset may notably intervene on the loaded mission in order to modify it. To this end, the mission server 7 may comprise a function for renaming the mission FM31, a function FM33 for creating a new phase in a mission, a function FM34 for renaming a phase of the mission, a function FM35 for deleting a phase of the mission or a function FM36 for modifying the order of the phases of the mission.

The mission server may also comprise a function FM37 for creating a mission element 6 in a phase, a function FM38 for modifying a mission element 6 or a function FM39 for erasing a mission element 6.

Furthermore, the mission server also comprises a function FM32 for erasing a mission.

In a symmetrical manner, the master headset can execute a function FC07 for creating a mission, a function FC08 for renaming a mission, a function FC09 for creating a phase of a mission, a function FC10 for modifying a phase of mission, a function FC11 for deleting a phase of a mission, a function FC12 for creating mission elements 6, a function FC13 for modifying mission elements 6 and a function FC14 for deleting mission elements.

The three dimensional virtual map 101 is carried out by placing terrain tiles 102 over a relief constituted by elevation tiles 103. These terrain 102 and elevation 103 tiles are provided by the mapping server 9. Each of the headsets 10*a*, 10*b* and 10*c* can regularly make a request R201 for terrain tiles 102 and elevation tiles 103, the request R201 comprising the position pos100 of the centre 104 of the map 101. The position pos100 of the centre 104 of the map 101 may notably be adjusted by the master headset.

When the master headset sends a command C200 comprising a new centre or a new zoom level, the sharing server 8 then transmits a notification of a change of centre or zoom to all of the headsets. Each headset then includes the new position pos100 in its tile request R201.

The master headset may for example execute a function FC15 for adjusting the zoom level, the zoom level being memorised and shared by the sharing server.

The master headset may also execute a function FC16 for translating the centre of the map along an X axis or along a Y axis to adjust a new centre of the map, memorised and shared by the sharing server. The master headset may also execute a function FC21 for centring the map around a point input by the master user, to adjust a new centre of the map, memorised and shared by the sharing server.

The master headset may also execute a function FC17 for adjusting the vertical exaggeration in the mapping hologram, this exaggeration level being memorised and shared by the sharing server.

The shared zoom level, the exaggeration level and the centre of the map may also be accessed by the mapping server, the mission editor or the mission server.

On reception of the request R201, the mapping server 9 generates, from the mapping 1000 that it stores in a memory, the terrain 102 and elevation 103 tiles corresponding to the position comprised in the request R201 and as a function of the zoom level to provide the terrain 102 and elevation 103 tiles to the headsets that have made the request.

Each augmented reality headset 10*a*, 10*b* and 10*c* being standalone, it is the application installed on each headset which manages the updating of data. Each headset may comprise a map loading function FC27. Each headset may also comprise a function FC20 for displaying one or more georeferenced image layers, as a function of elevation data.

Thus the updating of the mapping hologram is notably based on:
- the server 8 for sharing the position of the centre 104 of the map 101 and the zoom level,
- the mission server 7 which shares information necessary for the display of the mission, such as for example information on the mission underway and notably a phase underway or a transition from one phase to the other, as a function of the centre of the map and the zoom level.
- the applications installed on the headsets 10*a*, 10*b* and 10*c*, notably for the management of the stereoscopic display of a mapping hologram including notably mission elements 6 superimposed on a three dimensional map, the mapping server 9 which provides the tiles to each headset, on request, as a function of the centre of the map and the zoom level.

Figure 2:
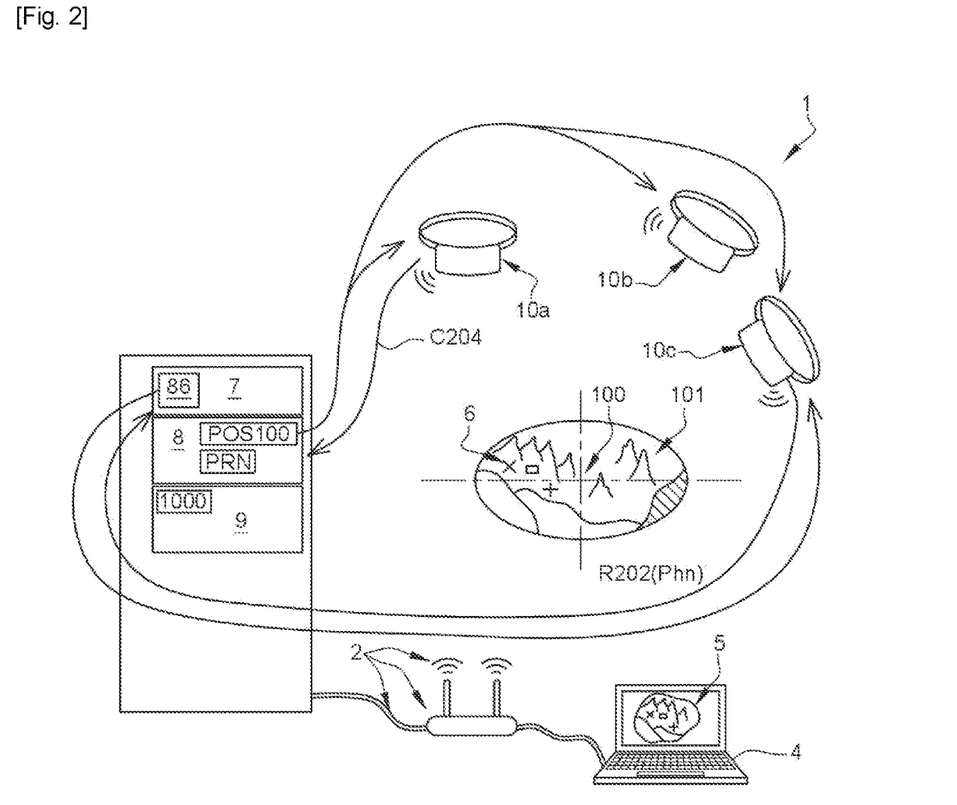
FIG. 2 also shows a schematic representation of an exemplary exchange of data in a mission preparation system according to the invention.

FIG. 2 shows an exemplary exchange of data in a mission preparation system according to the invention where data for updating the mission underway are exchanged. Each headset comprises for example a function FC01 for loading a mission stored on the mission server and a function FC02 for displaying the mission elements 6 in the mapping hologram. Each headset may also comprise a function FC25 for periodically verifying the phase underway.

The headset 10*a*, which is here the master headset, sends a command C204 to the sharing server to make the phase underway change to the following phase or to the preceding phase. The master headset executes for example a function FC03 for passage to the following phase or a function FC04 for passage to the preceding phase.

The sharing server then notifies each of the headsets 10*a*, 10*b* and 10*c* of the change of phase underway. Each headset can then make a request R202 to update the mission elements 6. Here only the example of the headset 10*c* is represented for greater clarity on the drawing. This request R202, sent to the mission server 7, comprises an indication of the new phase PhN. On reception of this request R202, the mission server 7 transmits to each headset data representative of the updated mission elements 6. This updating consists for example of a new position or a deletion or a new attribute modifying the representation of mission element 6. Each headset comprises for example a function FC26 for loading a new phase. Each headset may also comprise an animation function FC06 for displaying transition elements for one or more mission elements 6, these transition elements being representative of a movement or a route from one position to the other.

Thus, during a change of phase of mission, each headset can for example generate graphic animation objects representative of a displacement of an object on the map. When a mission element 6 is present in the current phase of the mission and in the following phase of the mission, then an animation may be carried out to represent the displacement of this element 6 on the map 101. The mission element 6, follows for example the relief of the terrain, by covering a path linking, in a straight line, the starting point belonging to the current phase and the final point which belongs to the following phase. This path is for example covered in a determined time whatever the distance between the two points.

Figure 3:
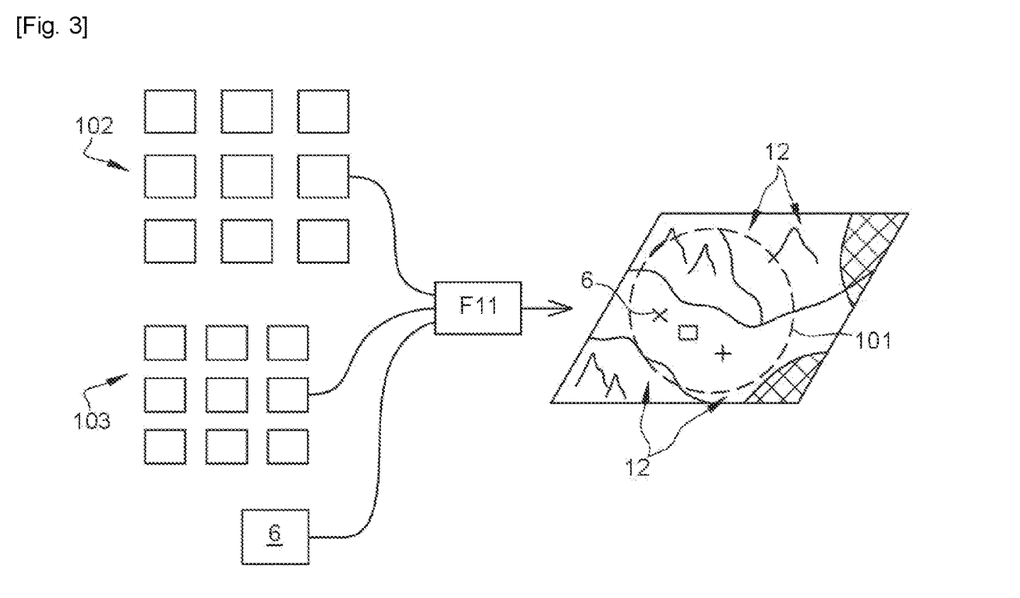
FIG. 3 shows a schematic representation of an exemplary embodiment of a hologram simulation for an augmented reality headset according to the invention.

FIG. 3 shows a schematic representation of an exemplary embodiment of hologram simulation for an augmented reality headset.

The holograph simulation function F11 is carried out by each headset 10*a*, 10*b* and 10*c* thanks to a stereoscopic display. The mapping server provides for example two sets of image and relief tiles covering a same geographic area in input of the holograph simulation function F11. The holograph simulation function F11 takes as input a plurality of terrain tiles 102, a plurality of elevation tiles 103, for example received from the mapping server 9, and data representative of the mission elements 6.

At the output of the holograph simulation function F11, the simulated mapping hologram comprises the virtual map 101 in relief and the mission elements 6.

A simulated hologram is a three dimensional virtual object displayed on an augmented reality headset 10*a*, 10*b* and 10*c* in a stereoscopic manner by means of two screens: a screen for each eye.

The mapping hologram comprises the three dimensional virtual map 101 carried out by placing the tile images over the relief and by superimposing the mission elements 6 at the level of the relief. The limit 101 in dotted lines represents for example the mapping in relief actually displayed in the mapping hologram.

The hologram generation data are for example also calculated in an area 12 situated beyond the edge of the zone 101 displayed, so as to increase the fluidity of display in the event of modification of the centre 104 of the map 101. The hologram generation data can thus be calculated for a more extended hologram than the displayed mapping hologram.

Several elementary functions are for example used for realising this hologram simulation function F11.

Each headset also comprises for example the taking into account of the exaggeration of the relief, the relief being able to be reduced or exaggerated from the same elevation tiles.

Figure 4:
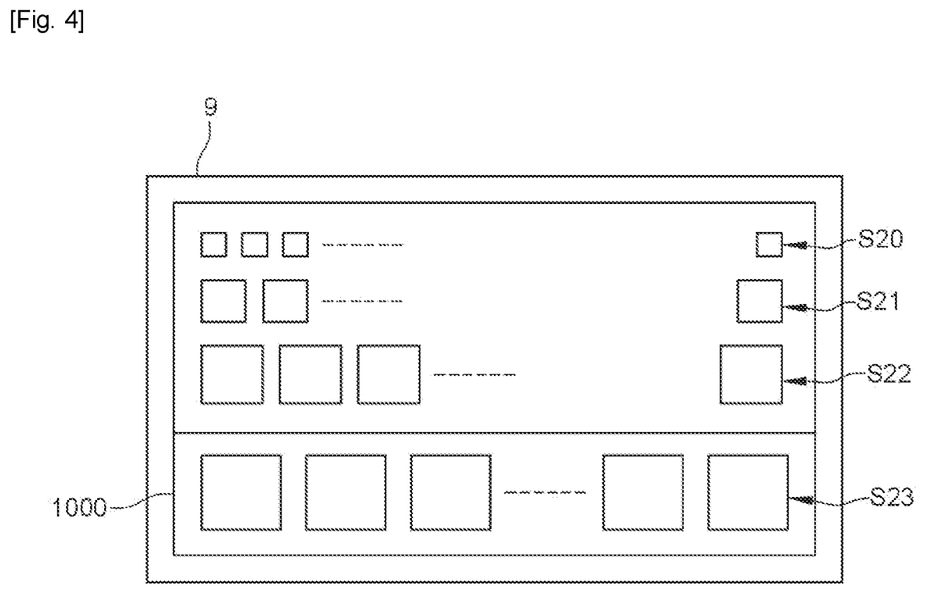
FIG. 4 shows a schematic representation of an exemplary mapping management according to the invention.

FIG. 4 shows a schematic representation of an exemplary mapping management.

The mapping server 9 can thus calculate and store in a memory, from an extended high definition zone of determined surface area, a first series S20 of tiles of a first high definition level and at least one second series S21 of tiles of a second lower definition level. "Extended high definition zone of determined surface area" is taken to mean a high definition image, coming for example from a satellite, of a determined area, encompassing for example an entire district of a town. The mapping server 9 can thus calculate several series of tiles S20, S21, S22 and S23 of different definition levels. Hence, these different definition levels make it possible to carry out zooms rapidly, without having to calculate each set of tiles and to supply more rapidly the sets of tiles to the headsets 10*a*, 10*b* and 10*c*.

For example, if in FIG. 4, it is the series of tiles S23, of lower definition, which is used for the visualisation, when a user next wishes to zoom, the mapping server can immediately access the following series S22 to supply to the headsets 10*a*, 10*b* and 10*c*. In the same way, in the event of displacement of the centre of the map, tiles of same definition are accessed directly by the server.

Figure 5:
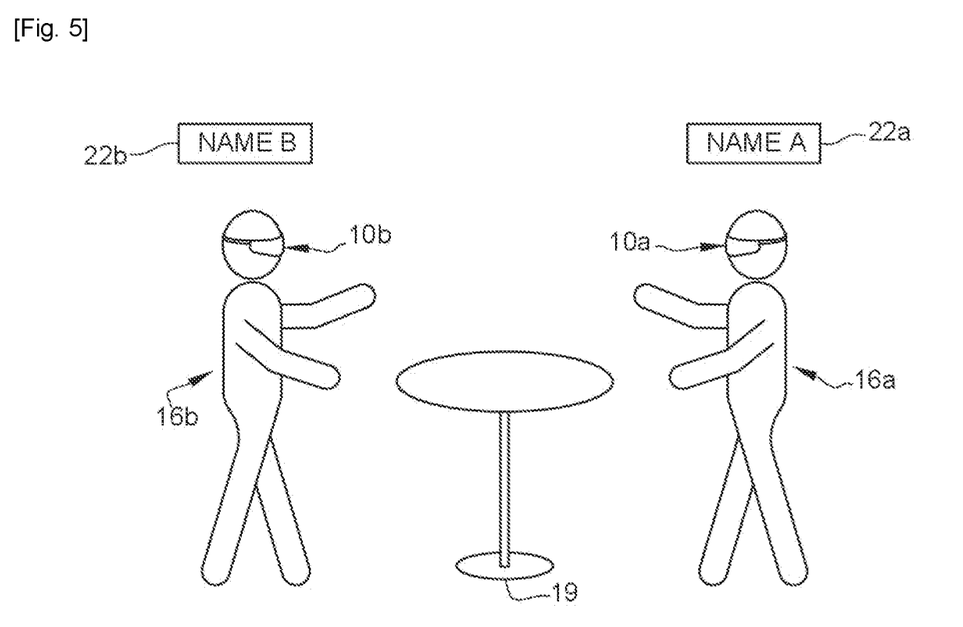
FIG. 5 shows schematically an exemplary use of the system according to the invention by two users physically positioned around a table.

FIG. 5 shows schematically an exemplary use of the system according to the invention by two users physically positioned around the table.

The users 16*a* and 16*b* represented are here situated in the same room and are positioned around a table 19. The table 19 is a hardware element located in the room with the users. The table can notably delimit physically the protection zone of the mapping hologram, thus avoiding a user having to stand up in the middle of the mapping hologram. The round table 19 adapts to the mapping hologram having a circular limit. The table as hardware element participates in the creation of the virtual environment of each headset 10*a* and 10*b* during spatialisation. Spatialisation is an operation carried out by each headset which consists in geolocating each headset in its environment and positioning all of the headsets in a virtual environment recreated by the headsets using their sensors. Each headset thus comprises a function for detecting its environment using these sensors. These sensors may be, for example, a camera, a depth sensor, or any other sensor enabling a headset to detect its hardware environment.

Each user 16*a* and 16*b* wears an augmented reality headset 10*a* and 10*b* and moves around the table 19. In each augmented reality headset 10*a* and 10*b*, the physical table 19 is augmented by a three-dimensional holographic map. It is then possible to "augment" one or more participants 16*a* and 16*b* by displaying, above each headset, data relative to this user 16*a* or 16*b*. These data may be, in a non-limiting manner, his name 22*a* and 22*b* or his status.

At least two statuses exist: a "master" status and a "spectator" status. A headset with the "master" status is for example in a position to modify mission data. During the modification of these data, a step also designated edition, the headsets with "spectator" status visualise the data in the course of modification by the user of the master headset, such as for example the displacement of an isolated mission element or a multipoint mission element.

Figure 6:
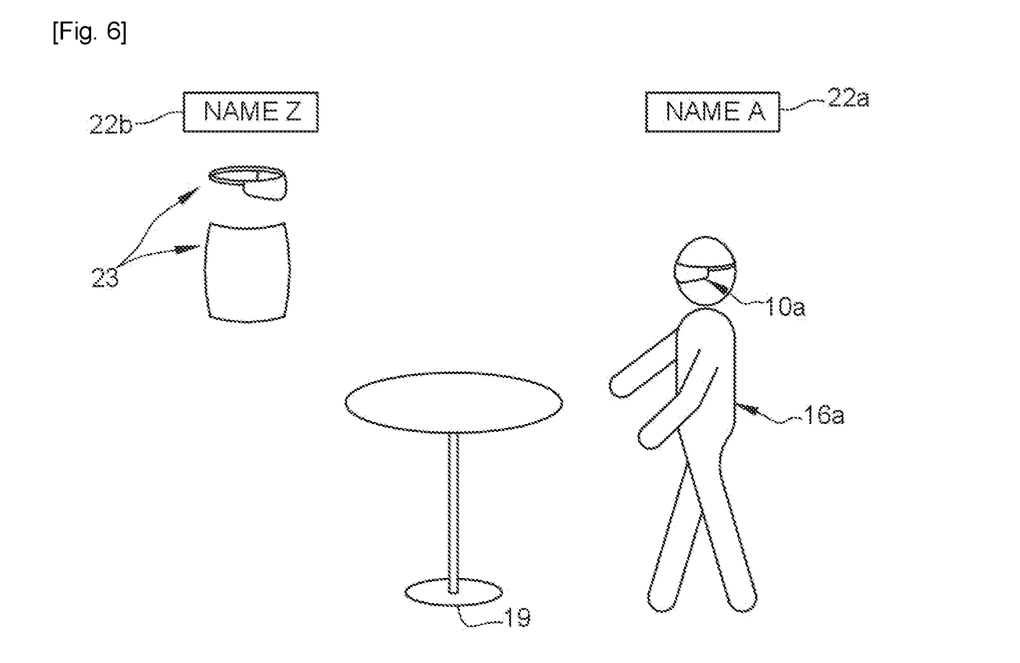
FIG. 6 shows schematically an exemplary use of the system according to the invention by two users, one being physically positioned around the table, the other being represented by an avatar.

This capacity is also exploited when the participant is at a distance in another room, the participant is then represented around the map by an avatar 23, as represented in FIG. 6.

FIG. 6 shows schematically an exemplary use of the system according to the invention by two users, one being physically positioned around the table, the other being represented by an avatar.

In FIG. 6, the user 16*b* is not present physically around the table 19, but is situated at a distance therefrom, for example several thousands of kilometres away. Whereas the user 16*a* is present physically around the table 19, the user 16*b*, not present physically around the table 19, is represented by an avatar 23, in the hologram generated by the other user. This avatar 23 is a virtual representation of the user not physically present in the room. The virtual representation 23 is then based on the initial position of the headset 10*b* in the room in which it is situated, on the initial orientation of the headset along at least three axes then on the positioning and orientation modifications. The virtual representation consists for example in a virtual object representing the body, the uniform or the bust of the user 16*b*.

Figure 7A:
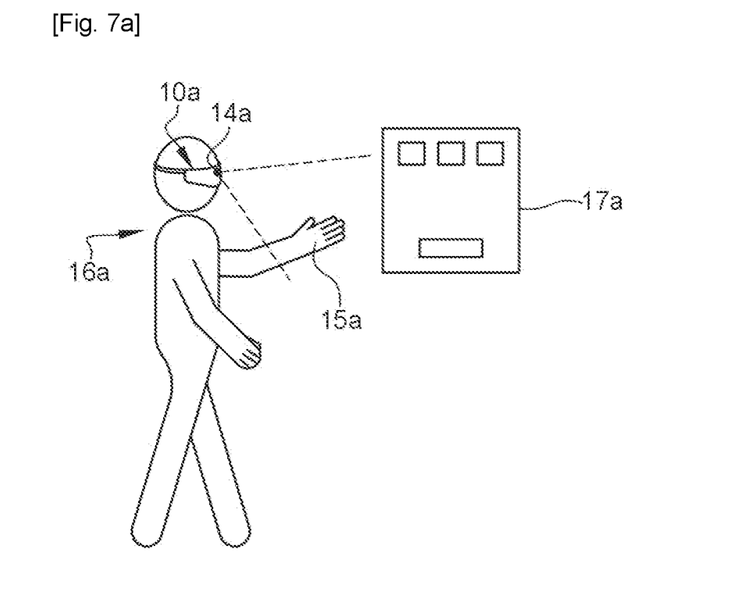
FIG. 7a shows a schematic representation of an exemplary management of display of mission data for the master headset.

FIG. 7*a* shows a schematic representation of an exemplary management for displaying mission data for the master headset.

As represented in FIG. 7*a*, the user 16*a* has at his disposal the headset 10*a* which has the status of master headset. The master headset 10*a* notably comprises a camera 14*a* and is configured to activate the camera 14*a* and to carry out an at least partial recognition of a hand 15*a* of the user 16*a*. This recognition of the hand 15*a* of the user 16*a* makes it possible to actuate functions, proposed in a displayed menu 17*a*. These functions may comprise for example a function for translating the centre 104 of the map 101 or modifying mission data, or a zoom action on the map 101. By clicking on buttons, the master headset carries out for example zoom functions on the map or on a mission element 6, exaggeration of the relief, or change of phase of the mission.

As described previously, the master headset is capable of making requests for change of phase of the mission underway, to the mission server 7. The mission server 7 can then share this change of mission phase information in order that each headset requests an update of the mission elements.

The temporal change of mission elements 6, in the course of the different phases, may be carried out on command of the master headset or by a work station linked with the mission server 7.

The master headset 10*a* may for example benefit from the display of panels 17*a* in three dimensions to control the mission preparation. These panels may comprise a panel for choosing the mission, a panel of mapping tools notably to zoom, carry out a vertical exaggeration or instead change a mapping layer, an edition panel enabling the addition, the deletion or the modification of mission elements 6 such as isolated symbols or multipoint symbols.

In another embodiment, it is also possible to use a pointing device (not represented) to make modifications to the mission data, or to press on buttons making it possible to carry out functions on the virtual map 101. This pointing device may for example be a remote control.

Figure 7B:
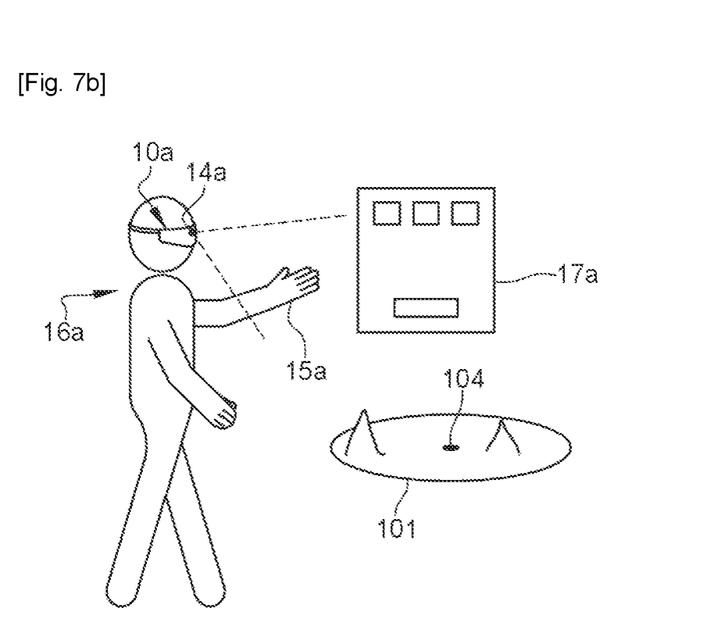
FIG. 7b also shows a schematic representation of an exemplary management of display of mission data for the master headset.

FIG. 7*b* shows a schematic representation of an exemplary management for displaying mission data for the master headset.

In FIG. 7*b*, the configuration data are superimposed on the virtual map 101. Thus, it is for example possible to visualise different steps of the mission or to display data on mission elements 6. The headset 10*a* can only display the command menu 17*a* when it recognises the hand 15*a* of the user 16*a*. This makes it possible for example to only display modification functions when the user 16*a* so wishes, in order to have better legibility of the virtual map 101.

Figure 8:
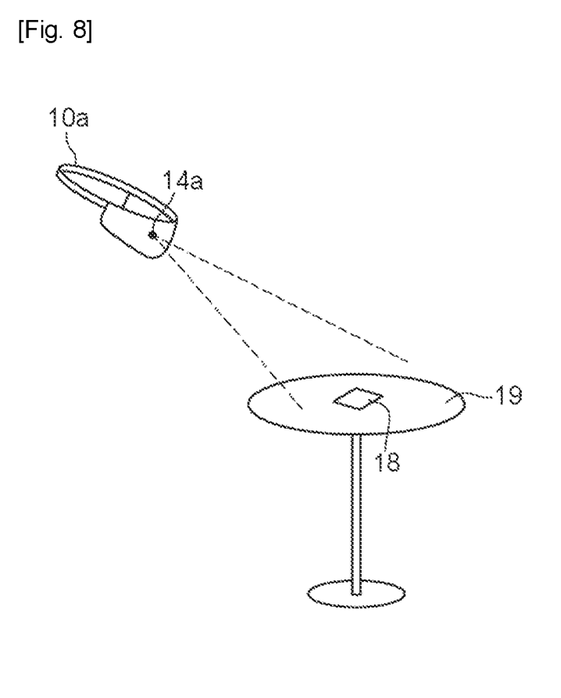
FIG. 8 shows schematically a marker arranged on a table and detected by the cameras of the augmented reality headsets.

FIG. 8 shows schematically a marker arranged on a table and detected by the cameras of the augmented reality headsets.

The marker 18 is arranged on a hardware object 19 around which gather the users of the headsets. The physical object may be a table 19, making it possible to position in the real world the physical marker 18 at the desired height for the display of the virtual map 101. The marker 18 allows the headsets to have a common frame of reference and to know the physical object 19 on which to place the virtual map 101. The marker 18 is read by a camera 14*a* of each headset. This reading of the marker 18 allows each headset to carry out a high precision adjustment of the positioning of the centre 104 of the map 101 as well as a high precision adjustment of the orientation of the map 101. By bringing great precision to the relative positioning of the headsets and the mapping hologram, the quality of interactivity between users is enhanced, such as for example, when a user points with his finger to the mapping hologram.

Figure 9:
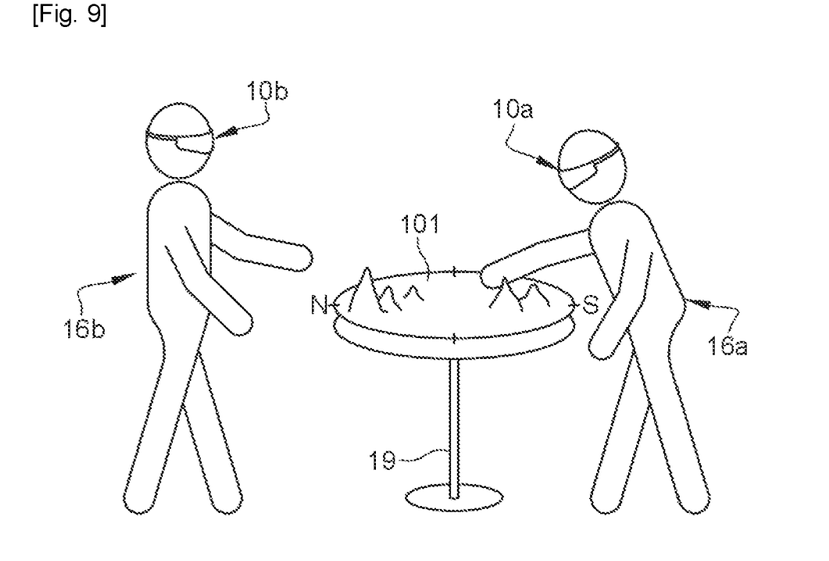
FIG. 9 shows schematically an exemplary interaction of a user with the three dimensional mapping hologram representing the virtual map and the mission elements.

FIG. 9 shows schematically an exemplary interaction of a user with the three dimensional mapping hologram representing the virtual map and the mission elements.

Each headset 10*a* and 10*b* is standalone and recreates its own view of the map 101. The mapping hologram created by each headset notably takes into account the mission data and the mapping data provided respectively by the mission server 7 and by the mapping server 9. Each headset also uses spatial parameters representative of its environment and its position relative to its environment. Other shared parameters such as the master or spectator statuses of the headsets are also used.

The three dimensional map 101 is projected in a hologram by each headset. The mapping hologram may for example be surrounded by a compass for a simple referencing of the orientation. This three dimensional representation can be viewed in the augmented reality headset 10*a* and 10*b* of each participant 16*a* and 16*b*. The map 101 provided by the mapping server is replaced in a reference system specific to each headset. The marker 18 makes it possible to define with greater precision the environment of each headset and thus position with greater precision each mapping hologram, notably its height, its dimensions and its orientation. Thus, each hologram is positioned with respect to a common hardware point of reference, which facilitates interactivity. A user will be able to point with his finger to a spot on his mapping hologram, this spot being identical on the holograms of the other headsets.

The zone of the displayed map 101 is composed of a plurality of terrain tiles 102, also designated image tiles, and a plurality of elevation tiles 103 provided by the mapping server 9.

It is also possible to envisage the provision of supplementary terrain and elevation tiles beyond the zone of the map to display, so as to have pre-loaded tiles. The displayed zone may be, in a non-limiting manner, a disc, a rectangle, a square. The tiles, pre-loaded and pre-processed by each headset, enable latency-free translation of the zone, since without loading time. If the translation of the displayed zone does not exceed the pre-loaded zone, then the display of the tiles is in fact immediate.

Figure 10:
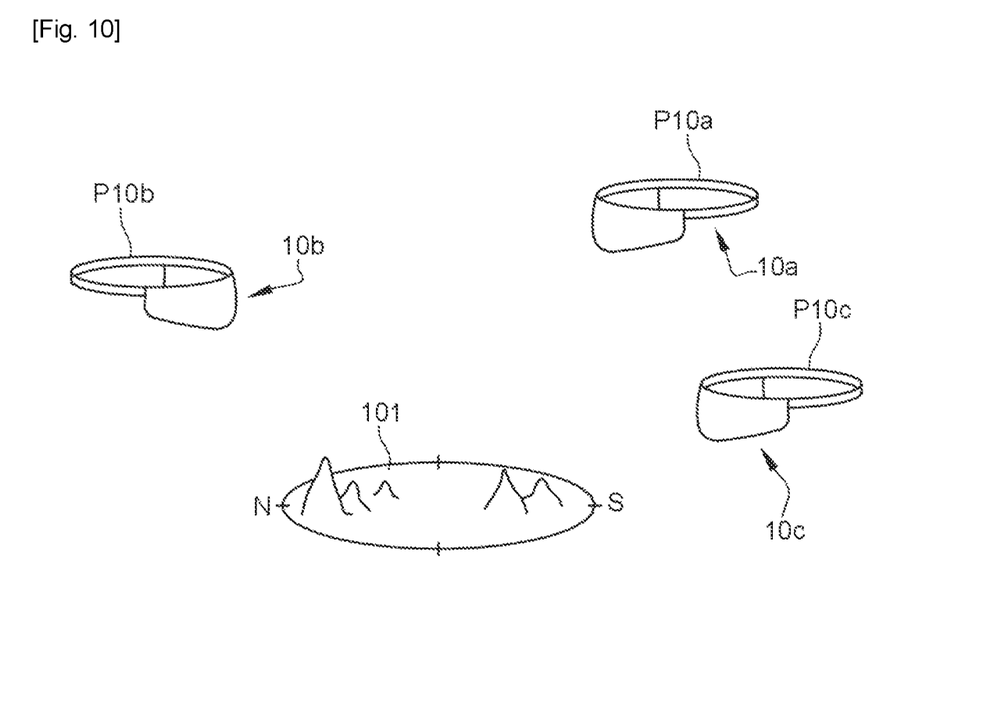
FIG. 10 is an exemplary schematic representation of the sharing of the relative positions of the headsets and the mapping hologram.

FIG. 10 is an exemplary schematic representation of the sharing of the relative positions of the headsets and the mapping hologram.

The sharing server 8 here carries out a sharing of the position P10*a*, P10*b* and P10*c* and the orientation of each headset 10*a*, 10*b* and 10*c* with respect to the map 101. The relative positions of the headsets are established as well as a relative position of the virtual map 101. Each headset will thus have a different viewpoint on the map during the projection of the mapping hologram.

Figure 11:
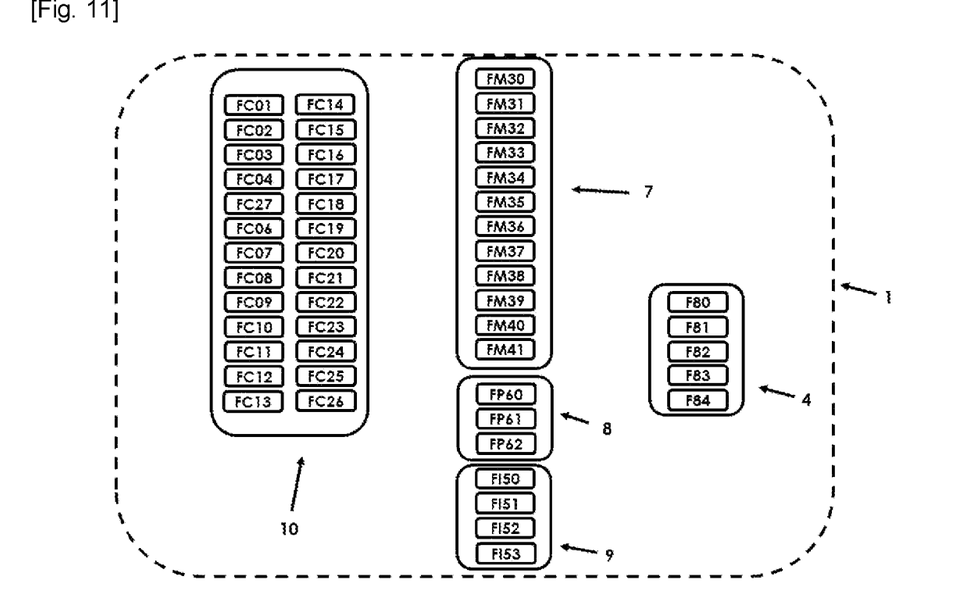
FIG. 11 is a schematic representation of an example of functions implemented in several entities spread out within the system according to the invention.

FIG. 11 is a schematic representation of an example of functions implemented in several entities spread out within the system according to the invention.

As explained previously, the mapping server 9 can execute a function FI50 for importing georeferenced images, for example in geoTiff or J peg2000 format, a function FI51 for importing georeferenced elevation models, a function FI52 for pre-calculating the series of tiles at the different zoom levels and a function FI53 for calculating and sending series of tiles as a function of the zoom level and the centre 104 of the virtual map 101.

The sharing server 8 may execute a function FP60 for sharing the position and the orientation of the headsets, a function FP61 for sharing the mission elements 6 in the course of modifications, for example during the modification of a mission by a master headset, and a function FP62 for sharing the centre 104 of the map 101 and the zoom level.

The digital mission editor 4 can create a mission comprising phases and mission elements, thanks to the mission creation function F80. The digital editor 4 may also comprise a mission modification function F81, a mission deletion function F82, a function F83 for loading a mission in the mission server 7 and a hybrid collaboration function F84 also designated "sandbox" mode.

As explained in part previously, the mission server 7 is configured to be able to execute the functions FM30 to FM41 of:
creating a mission FM30,
renaming a mission FM31,
deleting a mission FM32,
creating a phase in a mission FM33,
renaming a phase in a mission FM34,
deleting a phase in a mission FM35,
modifying the order of the phases in a mission FM36,
creating a mission element 6 in a phase FM37,
modifying a mission element 6 in a phase FM38,
deleting a mission element 6 in a phase FM39,
loading a mission FM40 and
loading a phase FM41.

Each augmented reality headset 10 (10*a*, 10*b* and 10*c*) is configured to be able to execute the functions FC01 to FC04 and FC06 to FC27 of:
loading a mission stored on the mission server 7 FC01,
displaying mission elements on the virtual map 101 FC02,
command for going to the following phase FC03,
command for returning to the preceding phase FC04,
creating an animation for the mission elements 6 present in the current phase and in the following phase FC06,
command for creating a mission FC07,
command for renaming a mission FC08,
command for creating a phase of a mission FC09,
command for modifying a phase of a mission FC10,
command for deleting a phase of a mission FC11,
command for creating a mission element 6 in a phase FC12,
command for modifying a mission element 6 in a phase FC13,
command for deleting a mission element 6 in a phase FC14,
zoom forwards or backwards FC15,
displacement of the map along the longitudinal axes X and Y FC16,
vertical exaggeration FC17,
visualisation of the curves of level FC18,
analysis of slopes FC19,
display of different layers on the virtual map 101 FC20, such as satellite image layers, vectorial data or other georeferenced images,
centring of the map on a point input by the user of the headset 10 FC21,
sharing of a point between the master headset and the spectator headsets FC22,
changing the role of the headset FC23, the master headset being capable of giving its role of master to another headset, formerly spectator,
displaying the identity 22*a* and 22*b* of each participant FC24,
periodically verifying the current phase FC25,
loading a phase of the mission FC26,
loading a virtual map 101 FC27.

We will now describe exemplary sequencings of operations in the mission preparation system according to the invention during the preparation of the mapping data on the server for a determined zone.

The mapping server 9 executes for example a function F150 for importing georeferenced images, then a function F151 for importing georeferenced images then a function F152 for pre-calculating the series of tiles at the different zoom levels.

We will now describe exemplary sequencings of operations in the mission preparation system according to the invention during the initialisation of a mission.

The mission is created from the mission editor by executing the mission creation function F80 then the mission modification function F81 and finally the function F83 for loading the mission in the mission server 7.

The mission server then executes the mission creation function FM30, the mission then being saved.

The sharing server then executes the function FP60 for sharing the position and the orientation of the headsets and the function FP62 for sharing the centre 104 of the map 101 and the zoom level.

The mission is next loaded in each headset which executes the mission loading function FC01 stored on the mission server. Then the command function FC03 to go to the following phase is carried out by the master headset.

The mission server then executes the phase loading function FM41 whereas the headsets execute the functions for periodically verifying the current phase FC25 and loading a phase of the mission FC26. The headsets can also execute the function for creating an animation for the mission elements 6 present in the current phase and in the following phase FC06.

We will now describe exemplary sequencings of operations in the mission preparation system according to the invention when the user of the master headset wishes for example to displace the virtual map 101.

The master headset carries out the function for displacing the virtual map 101 along the longitudinal axes X and Y FC16. This function FC16 leads to the sending of a command C200 to modify the centre 104 of the virtual map 101 to the sharing server 8.

The sharing server 8 receives the new centre 104 and notifies the adjustment of a new centre 104 to all the headsets by realising the function FP62 for sharing the centre 104 of the map 101 and the zoom level.

On reception of this notification from the sharing server 8 by the headsets 10a, 10b and 10c, the headsets each send a request R201 to update the map 101 while specifying the new centre 104 to the mapping server 9 by realising the function for loading a virtual map FC27.

On reception of this request R201, the mapping server 9 sends back the requested tiles while executing the function F153 for calculating and sending series of tiles as a function of the zoom level and the centre 104 of the virtual map 101.

The commands generated on the master headset have thus led to centralised calculations for the sharing of a virtual object.

We will now describe exemplary sequencings of operations in the mission preparation system according to the invention when the user of the master headset wishes for example to carry out a forwards or backwards zoom on the virtual map 101.

The forwards or backwards zoom function FC15 is carried out by the master headset. This zoom level modification function FC15 leads to the sending of a command for modifying the zoom of the virtual map 101 to the sharing server 8.

The sharing server 8, after reception of the new zoom level, notifies the adjustment of a new zoom level to all the headsets by realising the function FP62 for sharing the centre 104 of the map 101 and the zoom level.

On reception of this notification from the sharing server 8 by the headsets 10a, 10b and 10c, the headsets each send, to the mapping server 9, a request R201 to update the virtual map by specifying the centre 104 of the map and the zoom level while executing the map loading function FC27.

On reception of this request R201, the mapping server 9 sends back the requested tiles by realising the function F153 for calculating and sending series of tiles as a function of the zoom level and the centre 104 of the virtual map 101.

Once again, commands generated on the master headset lead to centralised calculations for the sharing of a virtual object. The computing power is centralised for performances at least equivalent to the document of the prior art where each stream is generated individually and where display disparities may besides appear from one headset to the other.

Furthermore, each user benefiting from his own 3D view of the terrain, which allows him to visualise instantaneously the terrain and to understand more quickly the situation relative to the terrain and to the mission.

We will now describe exemplary sequencings of operations in the mission preparation system according to the invention when the user of the master headset wishes for example to modify an existing mission from his headset, for example by modifying one or more mission elements 6 in a determined phase of the mission.

The master headset carries out the mission element command modification function 6 FC13.

This function FC13 leads to the sending of a command for sharing the modifications on the mission elements 6, to the sharing server 8. The users of the spectator headsets are then notified of a modification underway, for example thanks to the sharing server 8 which shares the position of the mission element 6 being edited by executing the specific function for sharing the elements 6 undergoing modifications FP61. When the user of the master headset validates the modification as definitive, by deactivating the previously activated function FC13, the mission server 7 carries out a mission saving function in the mission server 7 FM38. Each headset then requests from the mission server 7 the updated mission elements 6 while executing their phase loading function FC26, while the mission server executes its phase loading function FM41.

During the loading of a phase of a mission, for example following a change of mission phase command such as the command functions to go to the following phase FC03 or the command to return to the preceding phase FC04, carried out by the master headset, the mission server 7 carries out the mission phase loading function FM41 and each headset carries out the mission phase loading function FC26.

When a new phase is loaded by the mission server 7 or when any modification intervenes on a mission, for example a modification of phase or mission element 6, the mission editor 4 is notified of the mission modification, for example by the sharing server 8, and is updated by requesting the new mission data from the mission server 7.

We will now describe exemplary sequencings of operations in the mission preparation system according to the invention when the user of the master headset wishes for example to use terrain analysis tools.

The master user may thus use the function FC21 for centring on a place, the function FC16 for translating the map, the zoom function FC15, the function FC17 for exaggerating the relief, the function FC20 for modifying the map background such as for example a satellite view or city plan, the function FC18 for visualising level curves or the slope analysis function FC19.

The sharing server 8 notably carries out the function for sharing the position and the orientation of the headsets FP60 and for sharing FP62 the centre of map and the zoom level.

We will now describe exemplary sequencings of operations in the mission preparation system according to the invention when the user of the master headset wishes for example to create a mission from the headset directly on the mission server 7, load the mission in the headsets and replay it.

The master headset carries out, sequentially, the functions of command to create a mission FC07, command to rename a mission FC08, command to create at least one phase of a mission FC09 then command to create at least one element 6 of a mission in a phase FC12. The master headset may also execute a command FC10 to modify a phase of a mission or a command FC11 to delete a phase of a mission. The master headset can also execute a command FC13 to modify a mission element 6 in a phase or a command FC14 to delete a mission element 6 in a phase.

A command FC01 to load the mission is next carried out in each headset.

As described previously, the master headset can next pass from the current phase to the following or preceding phase of the mission or instead realise terrain analysis tools.

We will now describe exemplary sequencings of operations in the mission preparation system according to the invention during a hybrid collaboration between the headsets and the mission editor.

For the preparation of the mapping data on the mapping server on a determined zone, the mapping server 9 can execute the function F150 for importing georeferenced images, the function F151 for importing georeferenced elevation models and the function F152 for pre-calculating series of tiles at the different zoom levels.

A mission is next created from the editor which executes the mission creation function F80, then the mission modification function F81 and the function F83 for loading the mission in the mission server 7.

The mission server 7 then executes the mission creation function FM30 and thus saves a mission.

The sharing server 8 next executes the function FP60 for sharing the position and the orientation of the headsets and the function FP62 for sharing the centre 104 of the map 101 and the zoom level.

Each headset then executes the function for loading the mission stored on the mission server 7.

The replay of the mission is next performed on the mission editor in collaboration with at least one other user wearing a headset. The sandbox function F84, carried out by the mission editor, makes it possible to synchronise with the headsets thanks to a periodic loading of the mission, of which the mission and the phase underway, and the periodic loading of the centre of map and the zoom level.

As described previously, a command to go to the following phase FC03 is for example carried out by the master headset. A loading of a new phase FM41 is carried out by the mission server while each headset can carry out a periodic verification FC25 of the current phase and loading FC26 of a new phase of the mission.

The invention claimed is:

1. A mission preparation system for preparing a mission in a determined georeferenced zone from a digital mapping stored in a memory, comprising a digital mission editor in the georeferenced zone generating a set of georeferenced mission elements which are changeable over the course of several determined temporal phases, the mission preparation system comprises in a communication network at least:
   a mission server in communication link with the digital mission editor,
   a mapping server generating a map from the stored digital mapping,
   a sharing server for sharing at least one centre of the map and
   a plurality of augmented reality headsets,
at least one of the augmented reality headsets being a master headset and adapted to generate at least one command for at least one modification of the centre of the map, each augmented reality headset being adapted to send a tile request to the mapping server, the tile request comprising the centre of the map, each augmented reality headset being adapted to receive at least two sets of elevation and terrain tiles coming from the mapping server on request of each headset, the mission server being adapted to interface with the mission editor and with the augmented reality headsets to share and update the set of georeferenced mission elements on request of each headset and to make them evolve temporally on request of at least the master headset, the sharing server being adapted to receive, from the master headset, the modification of the centre of the map and to transmit a notification of the modification of the new centre to the augmented reality headsets in order to allow each augmented reality headset to include the modification of the centre of the map in their tile request to the mapping server.

2. The mission preparation system according to claim 1, wherein each headset comprises a hologram simulation function, by stereoscopic display, the hologram comprising a three-dimensional mapping in which the terrain tiles are placed over a relief constituted by the elevation tiles and superimposing the mission elements at the level of the relief.

3. The mission preparation system according to claim 2, wherein the hologram simulation function of each headset carries out a three-dimensional hologram calculation in an area at an edge of the displayed hologram, ready to be projected in a fluid manner in the event of modification of the centre of the map.

4. The mission preparation system according to claim 3, wherein said master headset activates at least one camera for at least partial recognition of a hand of a user of the master headset for actuating functions, proposed in a displayed menu, for at least one translation of the centre of the map.

5. The mission preparation system according to claim 1, wherein the last centre of the map adjusted by the master headset is taken into account for the tile requests of each headset, transmissions of previous tiles on intermediate modified centres being abandoned.

6. The mission preparation system according to claim 1, further comprising at least one marker arranged on at least one hardware object around which gather the users of the headsets, an image of said marker being captured by a camera of each headset and processed to carry out an adjustment of the positioning of the centre of the map and an adjustment of the orientation of the map.

7. The mission preparation system according to claim 6, wherein said hardware object around which gather the users of the headsets is in the form of a table of surface corresponding substantially to the surface on the ground of the displayed hologram.

8. The mission preparation system according to claim 1, wherein the sharing server also carries out a sharing of at least the position of each headset with respect to the map, and a sharing of the zoom level.

9. The mission preparation system according to claim 1, wherein the mapping server calculates and stores in a memory, from the digital mapping, a first series of tiles of a first high definition level and at least one second series of tiles of a second lower definition level.

10. The mission preparation system according to claim 1, wherein each headset comprises a function for detecting its hardware environment.

* * * * *